United States Patent [19]

Becker et al.

[11] 4,337,563
[45] Jul. 6, 1982

[54] METHOD OF ASSEMBLING MULTIPLE WALL DRILL PIPE

[75] Inventors: Floyd W. Becker; Richard R. Regimbal, both of Calgary, Canada

[73] Assignee: Drill Systems, Inc., Calgary, Canada

[21] Appl. No.: 166,143

[22] Filed: Jul. 7, 1980

Related U.S. Application Data

[62] Division of Ser. No. 890,068, Mar. 27, 1978, Pat. No. 4,274,663.

[51] Int. Cl.³ .............................................. B23P 11/02
[52] U.S. Cl. .................................... 29/451; 29/455 R; 138/148; 175/215; 277/1
[58] Field of Search ...................... 29/451, 450, 455 R; 138/148; 175/215; 285/18, 2, 24, 133 R, 304, 133 A, 305, 276; 277/1

[56] References Cited

U.S. PATENT DOCUMENTS

| | | | |
|---|---|---|---|
| 1,930,285 | 10/1933 | Robinson | 138/148 X |
| 2,738,992 | 3/1956 | Heisler | 29/451 UX |
| 2,895,512 | 7/1959 | Forsyth et al. | 138/148 X |
| 3,332,446 | 7/1967 | Mann | 138/148 X |
| 3,487,534 | 1/1970 | Schustack | 285/18 X |
| 3,503,636 | 3/1970 | Bower | 285/305 |
| 3,552,778 | 1/1971 | Muller | 285/276 X |
| 3,639,972 | 2/1972 | Schelin et al. | 29/451 |

*Primary Examiner*—Charlie T. Moon
*Attorney, Agent, or Firm*—Bruce G. Klaas

[57] ABSTRACT

Multiple wall drill pipe adapted for use in a drill pipe string comprising an outer pipe member; an inner pipe member disposed within the outer pipe member; and means for releasably connecting the inner pipe member and the outer pipe member in fixed axial relationship under force loads applied in use during a drilling operation while enabling relative rotary movement between the inner pipe member and the outer pipe member during a rotary drilling operation to relieve torsional stress thereon, and for permitting the removal of the inner pipe member from the outer pipe member by relative axial displacement therebetween caused by application to the inner pipe member of only an axially directed force load in excess of the axially directed force loads applied to the inner pipe member in use during a normal drilling operation.

4 Claims, 7 Drawing Figures

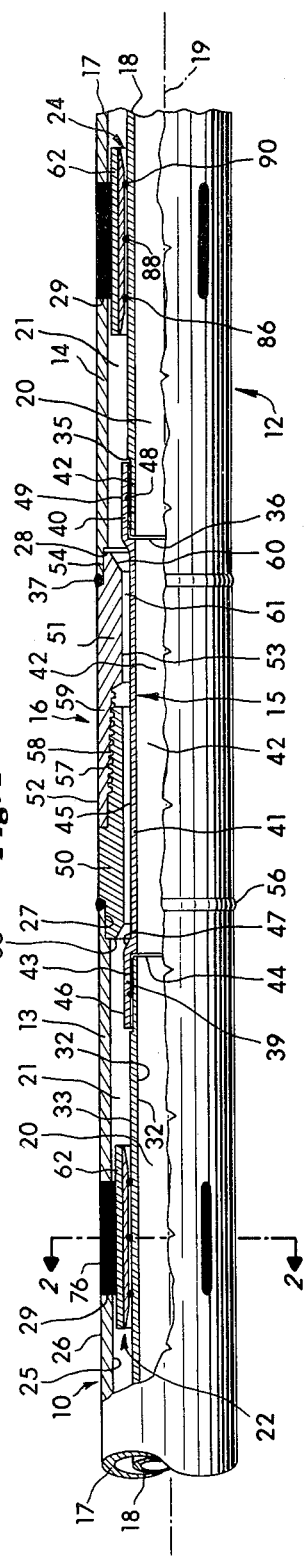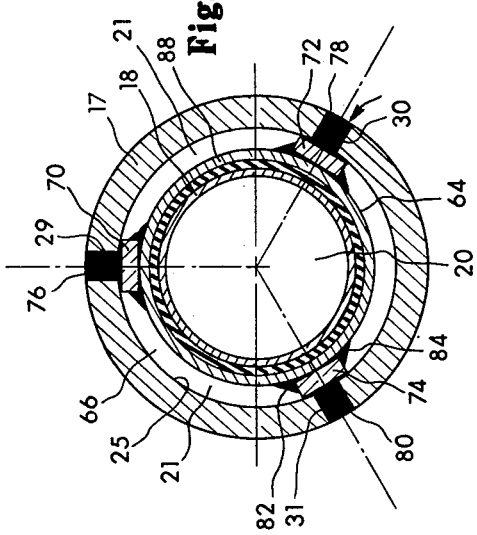

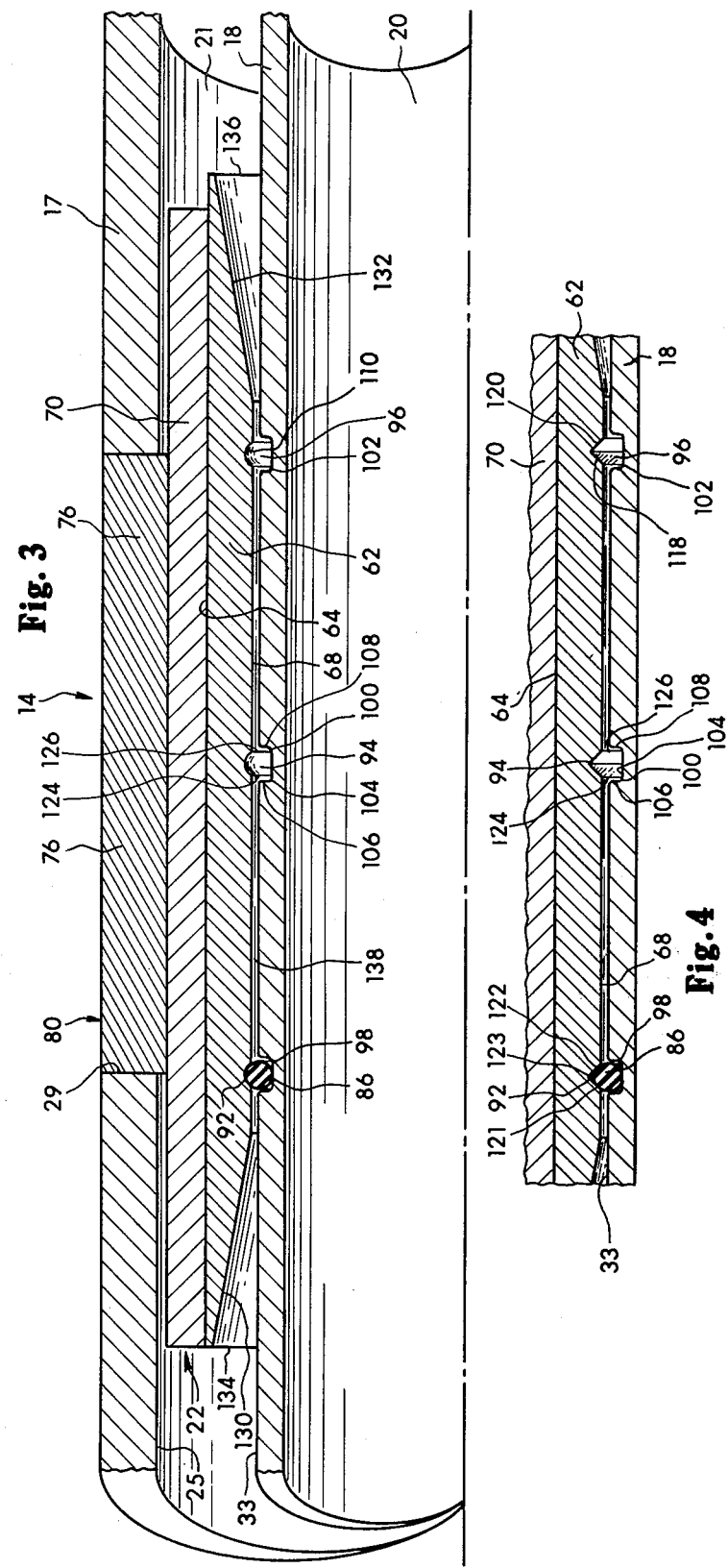

METHOD OF ASSEMBLING MULTIPLE WALL DRILL PIPE

This is a division of application Ser. No. 890,068, filed Mar. 27, 1978, now U.S. Pat. No. 4,274,663, issued June 23, 1981.

BACKGROUND AND SUMMARY OF THE INVENTION

The present invention relates to drill pipe and more particularly to multiple wall drill pipe having means for releasably connecting an inner pipe member to an outer pipe member of the multiple wall drill pipe.

Multiple wall drill pipe, e.g., such as that shown in U.S. Pat. Nos. 1,547,461; 1,909,075; 2,850,264; 3,208,539; and 3,664,441, has been used for many years in both conventional and reverse circulation drilling operations. Such multiple wall pipe is conventionally made of an outer pipe member and an inner pipe member disposed concentrically within the outer pipe member and longitudinally fixed thereto such as by straps welded to the inner wall of the outer pipe member and the outer wall of the inner pipe member at one or more locations along the length of the multiple wall pipe. Sections of the multiple wall pipe are adapted to be joined in longitudinal alignment to form a drill pipe string extending from a cutting bit to the surface of the ground where the drilling operation is being conducted. Two continuous flow passages are formed in the multiple wall pipe, a central passage defined by the inner surfaces of the inner pipe members and an annular passage formed between the outer surfaces of the inner pipe members and the inner surfaces of the outer pipe members. These passages are used to transport a drilling fluid from the ground surface to the drill bit and then back to the surface. For example, in a reverse circulation drilling operation, drilling fluid is injected into the upper end of the annular passage under pressure, is forced downwardly therethrough to the drill bit and then returns to the surface through the central passage along with fragments generated by the drilling operation.

In rotary drilling operations using multiple wall drill pipe, torque is transmitted to the drill bit through the outer pipe members. It has been determined that if the inner pipe members are fixedly non-rotatably rigidly connected by welds to the outer pipe members, relatively high torsional stresses may be transmitted from the outer pipe member to the inner pipe member through the fixed non-rotatable rigid connections during rotary drilling operations with resulting pipe failures caused by torsional stress and metal fatigue. Such failures usually occur in an area at or adjacent the fixed welded connection between the inner and outer pipe members. In some situations, such failures may be repaired by replacement of the inner pipe member and rewelding of the fixed conditions. However, to the extent that repair of damaged sections of conventional multiple wall pipe has been possible at all, such repair has been extremely difficult and costly. Typical procedures for repair of broken or damaged connections between the inner and outer pipe have involved wall cutting operations such as with a torch, to effect necessary repair or replacement of component parts. This procedure is frequently found to be either mechanically or economically prohibitive, resulting in complete replacement of the damaged section with a new section of multiple wall pipe without salvage of either the inner or outer pipe member.

The present invention involves new and improved connecting means for releasably and rotatably connecting the inner pipe member to the outer pipe member to enable repair and/or replacement while holding the inner pipe member in fixed axial relationship under force loads applied in use during a drilling operation and while enabling relative rotary movement between the inner pipe member and the outer pipe member to relieve torsional stresses encountered during use, the releasable connecting means permitting the removal of the inner pipe member from the outer pipe member by relative axial displacement therebetween caused by application of only an axially directed force load in excess of the axially directed force loads applied to the pipe during use in a drilling operation. In general, the connecting means comprises a plurality of axially spaced sets of resilient compressible axially spaced connecting members mounted in corresponding axially spaced sets of axially spaced inner and outer groove means providing a plurality of axially interengaged stop surfaces which prevent relative axial movement between the inner pipe and the outer pipe in either direction occasioned by any axial forces applied thereto in use during a drilling operation whereby the inner pipe is located in fixed axial position relative to the outer pipe at more than one location along the length of the pipes.

In the illustrative and presently preferred embodiment of the invention there are at least two sets of connecting members and associated grooves with one set located adjacent one end of the pipe section and the other set located adjacent the other end of the pipe section to axially fix each end portion of the inner pipe member relative to each end portion of the outer pipe member. Each set of connecting members and associated grooves comprise three equally axially spaced inner groove means formed in the outer periphery of the inner pipe and three similarly equally axially spaced outer groove means formed in the inner periphery of a connecting sleeve means fixedly attached to the outer pipe member. The connecting members, which are resilient compressible O-ring members, are mounted in corresponding axially aligned ones of the inner and outer connecting groove means during assembly so as to connect and support the inner pipe member relative to the outer pipe member after assembly and during use in a manner preventing relative axial displacement while permitting relative rotational displacement during use and while enabling disassembly of the inner and outer pipe for repairs or the like upon application of axially directed forces in excess of any axially directed forces normally encountered during usage.

BRIEF DESCRIPTION OF THE DRAWING

A presently preferred and illustrative embodiment of the present invention is illustrated in the accompanying drawing in which:

FIG. 1 is a partially cutaway side elevational view showing adjacent ends of two sections of double walled pipe of the invention;

FIG. 2 is an enlarged cross sectional end view taken along the line 2—2 in FIG. 1;

FIG. 3 is an enlarged cross sectional side elevational view of a portion of the connecting means of the apparatus of FIG. 1 illustrating a first nominal size O-ring and groove relationship;

FIG. 4 is an enlarged cross sectional side elevational view of a portion of the connecting means of the apparatus of FIG. 3 having an alternative outer groove configuration;

DETAILED DESCRIPTION

Figure 7:
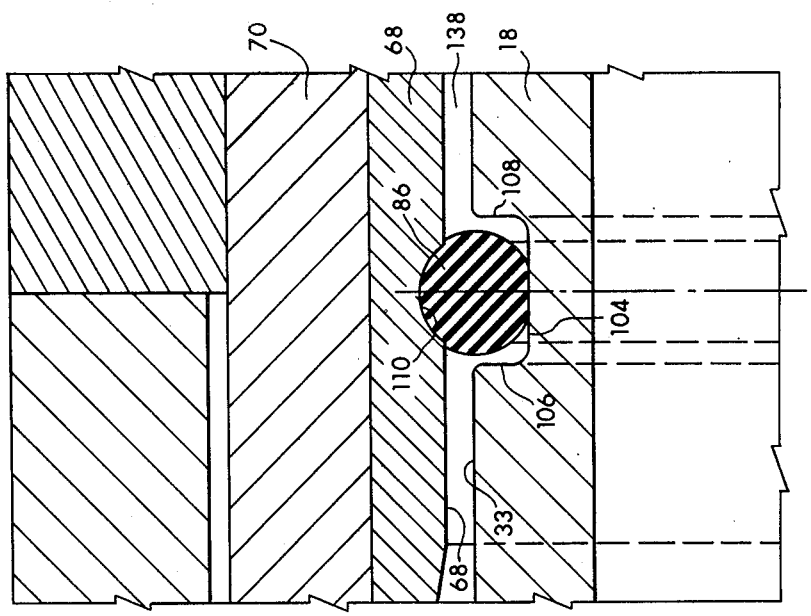
FIG. 7 is an enlarged cross-sectional view of a portion of an O-ring member and associated groove means of the apparatus of FIGS. 1–3 illustrating a second nominal size O-ring and groove relationship.

In general, in FIG. 1, a portion of a string of multiple wall drill pipe is shown to comprise first and second pipe section assemblies 10, 12, with adjacent end portions 13, 14 of the assemblies connected by inner and outer section connector means 15, 16. The pipe section assemblies 10, 12 are of identical construction and each pipe assembly comprises an annular elongated outer pipe means 17 and an annular elongated inner pipe means 18 mounted in coaxial telescopic relationship about a central longitudinal axis 19 to define an inner passage means 20 and an annular outer passage means 21. Each pipe assembly further comprises a plurality of axially spaced pipe connecting and mounting means assemblies 22, 24 located in the annular outer passage means 21 at the opposite end portions 13, 14 thereof.

The Outer Pipe Means

In the present preferred embodiment, each outer pipe means 17 comprises a single elongated continuous length of cylindrical pipe having inner and outer cylindrical surfaces 25, 26 of suitable diameter and being of suitable length and wall thickness. The opposite open end portions 13, 14 are provided with recessed enlarged counter bores 27 providing a radially extending locating shoulder surface 28. A plurality of axially extending circumferentially spaced connecting slots 29, 30, 31, FIG. 2, are provided in axially inwardly adjacent and spaced relationship to the counterbores 27, at each end portion 13, 14.

The Inner Pipe Means

In the presently preferred embodiment, each inner pipe means 18 comprises a single elongated continuous length of cylindrical pipe having inner and outer cylindrical surfaces 32, 33 of suitable diameter and being of suitable length and wall thickness. The outer surfaces 33 of the opposite open end portions are reduced in diameter to provide axially extending cylindrical connecting surfaces 34 and radially outwardly extending surfaces 35. The length of the inner pipe member is less than the length of the outer pipe member so that the end surfaces 36 of the inner pipe are axially inwardly offset relative to the end surfaces 37 of the outer pipe.

The Pipe Section Connector Means

In the presently preferred embodiment, the inner pipe section connector means 15, comprises an elongated cylindrical sleeve member having enlarged coupling portions 39, 40 of relatively short axial length on opposite ends of a relatively long axial length connecting portion 41 which has a cylindrical central passage 42 of approximately the same diameter as inner passage means 20. Each of the enlarged coupling portions 39, 40 comprises a cylindrical counterbore 43 having a diameter slightly larger than the diameter of cylindrical surface 34 so as to enable telescopic interconnection therebetween, and a radially inwardly extending locating shoulder surface 44 adapted to abut and/or axially locate the end surface 36 of the inner pipe 18 with the surface 35 of the inner pipe adapted to be axially spaced from the end surface of the sleeve member 15. The outer cylindrical surface 45 of the connecting portion 41 has a diameter approximately equal to the diameter of outer surfaces 33 of inner pipes 18. The outer cylindrical surfaces 46 of the coupling portions 39, 40 have a diameter greater than the diameter of the outer surfaces 33 of the inner pipes and are connected to the intermediate portion 41 by inclined surfaces 47. The outer diameter of portions 39, 40 also is slightly less than the inner diameter of connector means 16 to facilitate assembly. A fluid sealing means, in the form of resilient compressible O-ring member 48 mounted in an annular groove 49 in the inner peripheral surface 43 of each coupling portion 39, 40, is provided to seal annular outer passage 21 relative to central cylindrical passage 20.

The outer pipe section connector means 16 comprises a first male coupling member 50 fixedly connected to one end portion 13 of each pipe section and a second female coupling member 51 fixedly connected to the other end portion 14 of each pipe section. Each outer pipe coupling member comprises a cylindrical outer surface portion 52 having a diameter approximately equal to the outside diameter of the outer pipe, a wall thickness which may be greater than the thickness of the outer pipe, an inner cylindrical surface 53 with a diameter which may be smaller than the diameter of the inner wall 25 of the outer pipe, and reduced diameter cylindrical mounting surfaces 54 adapted to be slidably telescopically mounted in counterbores 27 with end surfaces 55 abuttable with and/or located by shoulder surfaces 28. The coupling members are fixedly connected to the outer pipe by weldments 56. The first male coupling member 50 is provided with tapered male threads 57 and the other coupling member 51 is provided with female tapered threads 58 on a female sleeve portion 59. Such an arrangement is conventionally referred to as a box and pin coupling in the drill pipe art.

Each of the coupling members has an inclined tapered surface 60 extending between the inner surface 25 of the outer pipe and the inner surfaces 53 of the coupling members which define an axially extending annular passage 61 connecting annular passages 21 of adjacent pipe sections. Passages 61 may be of approximately the same or slightly smaller cross-sectional area relative to passages 21. The diameter of surfaces 53 is slightly greater than the diameter of end surfaces 46 to enable guideably sliding relative axial displacement therebetween during assembly and disassembly of pipe sections.

The Inner and Outer Pipe Connecting Means

Each of the pipe connecting and mounting means assemblies 22, 24 comprises a cylindrical elongated sleeve member 62 having an outer cylindrical peripheral surface 64, FIG. 2, which is of substantially smaller diameter than outer pipe inner surface 25 to provide an annular flow passage 66, and an inner cylindrical peripheral surface 68 having a diameter which is slightly larger than the inner pipe outer surface 33. The sleeve member 62 is fixedly mounted in concentric coaxial relationship to and within the outer pipe member 17 by equally circumferentially spaced elongated attachment bar members 70, 72, 74, FIG. 2, which are fixedly connected to the outer pipe member by weldments 76, 78, 80 in slots 29, 30, 31 and to sleeve member 62 by weldments 82, 84.

The inner pipe member is connected to the outer pipe member through the sleeve member 62, the connecting bar members 70, 72, 74 and the weldments 76–84 by resilient compressible connecting ring means, in the form of a plurality of axially spaced O-ring type members 86, 88, 90 made of resilient compressible durable material, and connecting groove means, in the form of a corresponding plurality of axially spaced outer grooves 92, 94, 96, FIGS. 3 & 4, along the inner peripheral surface 68 of the sleeve member 62 and a corresponding plurality of axially spaced inner grooves 98, 100, 102 along the outer peripheral surface 33 of the inner pipe member 18.

The O-ring members of the illustrative embodiments are conventional O-ring members, such as a National O-Ring Company, Detroit, Mich., No. 224 for 3.5 inch outside diameter pipe sections or No. 334 for 4.5 inch outside diameter pipe sections, made of acrylonitrile (Buna N) synthetic rubber material having a durometer hardness of 70. The material should have low fluid absorption characteristics to avoid swelling in use and the hardness should be sufficient to provide adequate extrusion resistance while not being so hard as to cause the material to shear during assembly.

The axial spacing between the connecting groove means 92, 94, 96 of each sleeve member 62, the axially spacing of sleeve members 62 of each of the assemblies 22, 24, and the axial spacing between the connecting groove means 98, 100, 102 on the inner pipe member of each of the assemblies 22, 24 is relatively accurately controlled during manufacture and assembly so that the outer grooves 92, 94, 96 of each sleeve member 62 are axially alignable with the inner grooves 98, 100, 102 at each end of the inner pipe member 18.

Figure 5:
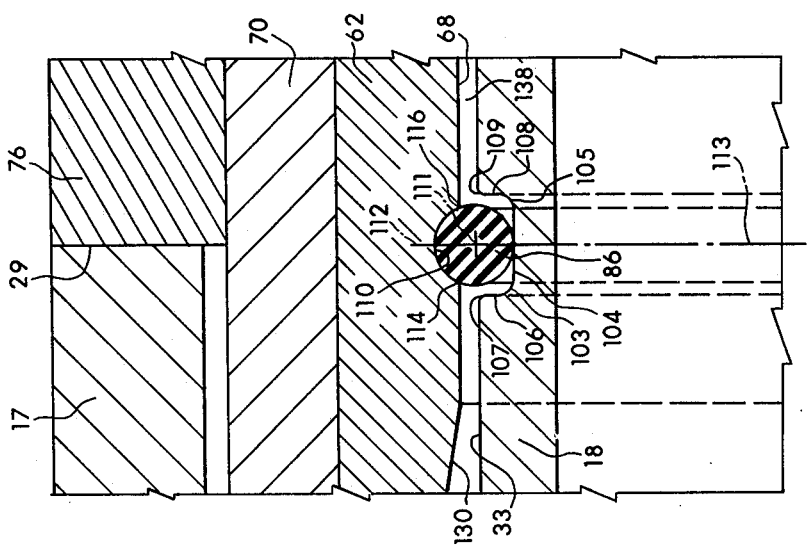
FIG. 5 is an enlarged cross-sectional side elevational view of the inner and outer groove portions of the apparatus of FIGS. 1–3.

While it is contemplated that the groove means 92–102 may have various cross sectional configurations, in the presently preferred embodiment, the inner pipe grooves 98, 100, 102 have a generally rectangular cross section with a substantially flat relatively wide annular bottom surface 104 and substantially flat axially spaced radially extending relatively narrow annular side surfaces 106, 108. As shown in FIG. 5, radially curved surfaces 103, 105 connect side surfaces 106, 108 with bottom surface 104 and radially curved surfaces 107, 109 connect side surfaces 106, 108 to the outer peripheral surface 33 of the inner pipe member. In one specific exemplary embodiment for a 3.5 inch outside diameter by 5 foot length section of drilling pipe, utilizing an inner pipe member having a nominal outside diameter of 2.000 inches, the nominal diameter of bottom surface 104 is 1.875 inches to provide inner grooves having a nominal depth of 0.0625 inch. The No. 224 O-ring members of this specific embodiment have nominal inside and outside diameters of 1.734 inches and 2.012 inches, respectively, and a nominal cross sectional diameter of 0.139 inch with a circumference of 0.4376 inch. Thus, in the assembled position in the grooves 98, 100, 102 on the inner pipe member 18, there is a nominal interference fit between the inner peripheral surface of the O-ring members and the bottom surfaces 104 of the grooves of approximately 0.0705 inch, for the purpose of fixedly frictionally retaining the O-ring members in the grooves after mounting prior to and during assembly insertion of the inner pipe member in the outer pipe member, during use after assembly mounting of the inner pipe member in the outer pipe member and during any subsequent disassembly removal of the inner pipe member from the outer pipe member for repairs and/or replacement. The width of the inner pipe grooves as measured between side surfaces 106, 108 is nominally 0.172 inch so that after mounting of the O-ring members there is a nominal total clearance fit between the side surfaces of the O-ring members and the side surfaces 106, 108 of the inner grooves of 0.033 inch less the amount of any lateral expansion of the O-ring members resulting from compression between the inner peripheral surfaces of the O-ring members and the bottom surfaces 104 of the inner grooves. When the O-ring members are mounted in the inner grooves, the O-ring members are radially expanded so as to then have an inside diameter of approximately 1.875 inch and outside diameter of approximately 2.153 inches which is greater than the nominal inside diameter of sleeve member 62 and approximately the same or slightly smaller than the nominal maximum diameter of the outer grooves 92, 94, 96. After mounting the O-rings in the inner grooves and prior to assembly of the pipe, the nominal depth of the inner grooves of 0.0625 inch is such as to confine and hold approximately the inner one-half (i.e., 0.0665 inch) or slightly less than one-half of the cross-section of the O-ring members between the inner groove side surfaces 106, 108 with approximately the outer one-half or slightly more than one-half of the cross-sectional periphery of the O-ring members extending radially outwardly beyond the outer peripheral surface 33 of the inner pipe member.

Figure 6:
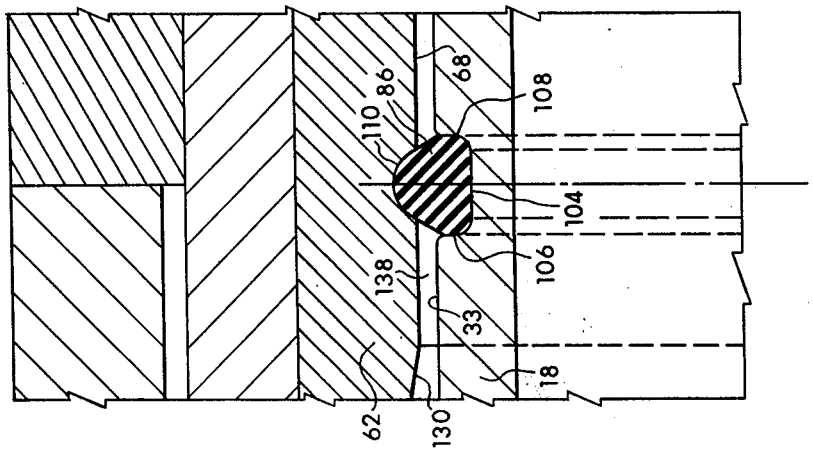
FIG. 6 is an enlarged cross-sectional view of a portion of an O-ring member and associated groove means of the apparatus of FIGS. 1–3 illustrating a minimum clearance relationship therebetween.

In general, the outer grooves 92, 94, 96 in the sleeve member 62, are of a size and shape to frictionally engage a radially outermost peripheral surface portion of the O-ring members with less than one-half of the cross sectional circumference of the O-ring members opposite the inner groove bottom surface 104 being confined in the outer groove as illustrated in FIGS. 5–7. The outer grooves also may variably compress one, some or all of the O-ring members along part or all of the circumference after assembly depending upon variations in nominal dimensions and concentricity of the pipe and sleeve members and grooves, and during use when the pipe sections are mounted in a vertical position and subject to variable drilling forces as illustrated in FIGS. 6 & 7. The construction and arrangement is such as to axially fixedly locate the inner pipe member relative to the outer pipe member after assembly and in use while also enabling relative rotational movement of the inner pipe member relative to the outer pipe member in use upon application of torsional stresses of such magnitude as would otherwise be capable of causing damage to conventional non-rotatable connecting means. In the outer groove embodiment of FIGS. 5 & 6, the groove surfaces 110 have a radially curved cross sectional configuration with a nominal radius approximately the same as the nominal cross sectional radius of the O-ring members. For example, in the specific exemplary embodiment, the nominal cross sectional radius of the O-ring member is 0.0685 inch and the nominal cross-sectional radius of the outer grooves is 0.069 inch. As shown in FIG. 5, the center of curvature 111 of the outer grooves is located radially inwardly of the inner peripheral surface 68 of sleeve member 62 in a transverse plane 112 adapted to be coplanar with the central transverse plane 113 of the inner grooves. The annular edge surfaces 114, 116 at the intersection of surfaces 68 & 110 are located axially inwardly of side surfaces 106, 108 of the inner grooves. In the outer groove embodiment of FIG. 4, the outer grooves have a V-shaped cross sectional configuration defined by oppositely inclined intersecting side surfaces 118, 120 adapted to engage circumferentially spaced peripheral portions 121, 122 of the O-ring members while providing a small gap 123 at the intersection of the side surfaces 121, 122 to accommodate compressible expansion of the O-ring members and prevent freezing of the O-ring members against the groove surfaces. In both outer groove embodiments, the axial distance between side edge surfaces 114, 116 and 124, 126 of the grooves is slightly less (e.g., approximately ⅔) than the axial distance between side surfaces 106, 108 of the inner grooves with the central planes of the inner and outer grooves being substantially aligned as illustrated in the drawing.

As illustrated in FIG. 6, in both the groove embodiments of FIGS. 4 & 5, the construction and arrangement is such that, in the assembled position, any compressive forces cause the O-ring members to generally more or less conform to the shape of the inner and outer grooves in which the O-ring members are mounted with the cross-sectional peripheral portion of the O-ring confined in the inner groove being greater than the cross-sectional peripheral portion of the O-ring being confined in the outer groove. While the amount of compression, if any, of the O-ring members and the exact abutting relationship between the cross-sectional periphery of the O-ring members and the surfaces 104, 106, 108 is variable depending upon the actual dimensional characteristics, the total nominal cross-sectional width of the side and bottom surfaces of the inner grooves is 0.297 inch and the nominal cross-sectional circumferential length of the O-ring members is 0.4376 inch so that, if portions of the peripheral surface of the O-ring members fully contact each of the inner groove surfaces as illustrated in FIG. 6, more than one-half of the cross-sectional peripheral surface of the O-ring members (e.g., approximately 0.297 inch of 0.4376 inch or approximately 68%) is confined within the inner groove surfaces. In addition, the surfaces of the outer grooves continue to abut substantially less than one-half of the cross-sectional peripheral portion of the O-ring members.

In order to facilitate assembly and disassembly of the inner pipe, the end portions of the sleeve members 62 have tapered conical surfaces 130, 132 extending radially outwardly from inner peripheral cylindrical surface 68 to inlet openings 134, 136 which are of substantially larger diameter than the outer peripheral diameter of the O-ring members. In the specific exemplary embodiment, the nominal diameter of inner peripheral surface 68 is 2.070 inches, the nominal diameter of the outer grooves of FIG. 3 is 2.153 inches, the nominal diameter of the inlet openings 134, 136 is 2.440 inches, and the angle of inclination of surfaces 130, 132 is approximately 10 degrees. The axial spacing between the outer grooves of each sleeve member and the corresponding inner grooves is approximately 1.50 inches. In the assembled position, the nominal radial spacing between inner groove bottom surfaces 104 and the radially outermost surface portions of the outer grooves is 0.139 inch, i.e., the same as the nominal cross sectional diameter of the O-ring members of 0.139 inch. In addition, the nominal radial width of the gap 138 between the outer peripheral surface 33 of inner pipe member 18 and the inner peripheral surface 68 of the sleeve members 62 is 0.035 inch which is approximately only one-fourth the nominal cross sectional diameter of 0.139 inch of the O-ring members whereby the O-ring members 140 are fixedly retained in the inner and outer grooves under all axial loads applied during use and prevent axial displacement of the inner pipe member relative to the outer pipe member during use while permitting the desired relative rotational movement therebetween. However, if it becomes necessary or desirable to remove the inner pipe member from the outer pipe member, the outer pipe member may be fixedly mounted in a conventional high pressure jaw or vice device and relatively high axial forces in excess of any axial forces encountered in use may be applied to one end of the inner pipe to drive the inner pipe out of the outer pipe by compression of the O-ring members against the bottom surfaces 104 of the inner grooves. In the event that the O-ring members are broken during removal of the inner pipe, and, in any event after substantial usage of the pipe, the old O-ring members may be replaced by new O-ring members after the inner pipe has been removed. The construction and arrangement is such that in use, the O-ring members next adjacent the inlet openings 134, 136 effectively seal the gap 138 between the inner pipe member and the mounting sleeve members 62 to prevent entry of foreign matter into the intermediate portion of the gap.

In another specific exemplary embodiment for a 4.5 inch outside diameter section of drill pipe, as illustrated in FIG. 7, the nominal dimensional characteristics are as follows: outside diameter of inner pipe member of 2.875 inches; maximum diameter of outer grooves of 3.062 inches with a radius of curvature of 0.105 inch; inside diameter of sleeve member 62 of 2.980 inch; diameter of inner groove surface 104 of 2.687 inch with width of 0.250 inch and depth of 0.094 inch; and normal outside and inside diameters of O-ring members of 2.6 inches and 3.020 inches, respectively, with a cross-sectional diameter of 0.210 inch. Thus, in the embodiment of FIG. 7, the nominal radial distance between groove surfaces 104 & 110 of 0.1875 inch is substantially less than the nominal cross-sectional diameter of 0.210 of the O-ring members to provide an interference fit causing compression of the O-ring members between the radially opposed groove surfaces after assembly of the pipe members 17, 18. In addition, the nominal radial depth of the outer grooves of 0.041 inch is substantially less than the nominal radial depth of 0.094 inch of the inner grooves, i.e., less than one half to confine a relatively smaller peripheral outer portion of the O-ring members and the nominal depth of 0.094 inch of the inner groove also confines a relatively smaller peripheral inner portion of the O-ring members than the prior described specific illustrative embodiment, the percentages of the nominal radial spacing between inner and outer groove surfaces being approximately 50% for the radial depth of the inner groove, 28.5% for the gap between the inner peripheral surface 68 of the sleeve members 62, and 21.5% for the radial depth of the outer groove means. In the embodiment of FIG. 7, three sets of connecting sleeve members 62, grooves and O-ring members are used with two at opposite ends of the pipe section and one midway therebetween. Each set has three outer grooves alignable with three corresponding inner grooves which are axially spaced 1.5 inches from one another as previously described. The theoretical cross-sectional configuration of the O-ring members under nominal dimensional compression in the assembled position is illustrated in FIG. 7. Again, in practice the theoretical cross-sectional configuration will vary between O-ring members and around the circumference of each O-ring member due to nominal dimensional variations and also due to variations in the width of the gap between the inner surfaces of the connecting sleeve members and the outer peripheral surface of the inner pipe member.

Manufacture, Assembly & Operation

After the outer pipe members 17, with the sleeve members 62 mounted therein, and the inner pipe members 18, with the inner grooves formed therein, have been separately constructed with relatively accurate dimensional tolerances being maintained, O-ring members 86, 88, 90 are forced over and along the end portions of the inner pipe member 18 to the adjacent inner grooves 98, 100, 102 thereon whereat the O-ring members are fixedly frictionally held in each of the inner grooves. Then one end of the inner pipe member 18 is inserted into one end of the outer pipe member 17 while the outer pipe member is fixedly held against axial movement by suitable high pressure clamping means (not shown). Suitable high pressure axial force applying means (not shown) engage the other end of the inner pipe member 18 to apply relatively high axial force thereto. The O-ring members on the one end of the inner pipe member are forced through the connecting sleeve member 62 adjacent the one end of the outer pipe member and the one end of the inner pipe member is then moved axially along the outer pipe member toward the other connecting sleeve member 62 adjacent the other end of outer pipe member until the O-ring members in all sets of inner grooves are located axially adjacent the corresponding sleeve members 62. The assembly is then completed by simultaneously sequentially forcing each set of O-ring members into the corresponding sleeve members and then continuing the axial movement until all O-ring members are seated in the corresponding outer groove means. If intermediate connecting sleeve members 62 are used, the assembly procedure is the same until all sets of O-ring members are seated in all the corresponding outer groove means. The construction and arrangement is such that minimum axial force is required to initiate the portion of the assembly operation during which the O-ring members on the one end of the inner pipe member are forced through the connecting sleeve member on the one end of the outer pipe member and maximum axial force is required to complete the assembly operation when all sets of O-ring members are within the corresponding sleeve members 62 prior to simultaneous final seating of all O-ring members in the corresponding outer grooves of each of the sleeve members. If the final axial assembly movement is continuous, less axial force is required than a step-by-step movement into and out of the outer grooves. Thus, once the assembly operation is completed, with all O-ring members for the first time being seated in all corresponding outer grooves, any subsequently initiated axial displacement of the inner pipe member relative to the outer pipe member requires greater axially applied force than during the assembly operation. For example, in the illustrative embodiments utilizing sets of three O-ring members and grooves for each sleeve member, all of the O-ring members must be simultaneously forced out of all of the corresponding outer grooves to initiate any such axial disassembly movement; whereas, the maximum number of O-ring members that are aligned with any combination of outer grooves, at any time prior to completion of the assembly, is only ⅔ of the total number of O-ring members and, at that time, the axial movement is continuous to reduce assembly resistance. In addition, during assembly, the O-ring members are gradually compressed between the bottom surfaces 104 of the inner grooves and one or the other of the tapered conical surfaces 130, 132 to further reduce assembly resistance. In order to facilitate assembly, the O-ring members are preferably lubricated and the lubrication material is preferably such that after assembly the lubricant may be washed away to increase the force required for disassembly of the pipe.

In the assembled position, at least the opposite end portions of the inner pipe member are connected to the outer pipe member by the axially spaced connecting means 22, 24. In longer lengths of pipe, additional centrally located connecting means of similar construction may be utilized between the end portion connecting means 22, 24. Each connecting means 22, 24 preferably provides at least two, or more preferably, three or more, separate relatively closely axially spaced connecting members 86, 88, 90 which cooperate to relatively axially fix the inner pipe member relative to the outer pipe member while also enabling relative rotational movement to relieve excessive torsional stresses in use. The relatively close axial spacing of the connecting members of each connecting means 22, 24 provides uniform rotational support over substantially the entire length of the connecting sleeve members 62 so as to prevent excessive wobble of the inner pipe member relative to the other pipe member. In addition, the use of multiple connecting members enables continued use of the pipe section even if one or more of the members fails during use.

Experiments have been conducted with sections of pipe of the type disclosed herein and having three connecting means, each having three O-ring members and associated inner and outer grooves with one connecting means located midway of the length of the pipe, with dimensional characteristics hereinbefore described with reference to FIG. 7. The experiments have indicated that an average maximum axially directed insertion force of approximately 2000 pounds is required during assembly of the inner pipe member into the outer pipe member before all nine O-ring connecting members are seated in and between all nine pairs of inner and outer groove means. It has been further found that for the same pipe section, an average maximum axially directed withdrawal force of approximately 2760 pounds is required to initiate relative axial movement between the inner and outer pipe members in the made up condition thereof to remove the inner pipe members from the outer pipe member. Thus, on the average, approximately 35% more force was required for disassembly than for assembly.

In use of the multiple wall pipe in rotary drilling operations, the outer pipe members 17 of each section of pipe are rigidly connected by the threaded connecting means 16 so that axial loads and torsional stresses in a string of pipe sections are confined to the outer pipe members and the connecting members 50, 59 therebetween. Each inner pipe member 18 is individually supported within its associated outer pipe member by the O-ring connecting means so that the only axial load on each inner pipe member is the weight thereof and the weight of the upper connecting sleeve member 15 which provide a downward axial load substantially less than the load supporting capacity of the O-ring members. Torsional stresses in the outer pipe members are accommodated and relieved by the O-ring members which enable relative rotation between the outer pipe members and the inner pipe members. The telescopic connections between the connecting sleeve members 15 and the adjacent ends of the inner pipe members of adjoining sections of pipe enables relative rotation therebetween. Thus, each individual component of the string of inner pipe members and connecting sleeve members is rotatable relative to the other individual components as well as relative to each individual component of the string of outer pipe members. In addition, all of the individual components of the inner pipe string are removable and replaceable to facilitate repair and/or maintenance. While the invention is particularly useful in connection with rotary drilling operations, it may also be useful in other types of drilling operations, such as hammer drilling operation, employing double walled pipe sections.

While the inventive concepts have been illustratively disclosed by the foregoing specific embodiments thereof, various alternative constructions and arrangements of the invention may be utilized. For example, while the inner and outer pipe members have been specifically disclosed as being connected by two or three axially spaced connecting means, each comprising three O-ring members associated with three pairs of axially aligned inner and outer groove means having particular dimensional characteristics, it will be apparent that the number of connecting means, the number of O-ring members and associated pairs of inner and outer groove means, and the dimensional characteristics thereof, may be varied depending upon pipe size, use requirements or other factors. In addition, the illustrative groove configurations may be modified as necessary or desirable. While the use of conventional O-ring members appears to provide particularly good results and minimize manufacturing as well as repair and replacement costs, other types of connecting members, such as coiled annular spring members or annular split ring members, may also be useful. Also, while the mounting of the O-ring members in the inner grooves on the inner pipe member and the provision of the outer grooves on a sleeve member attached to the outer pipe is a particularly satisfactory arrangement facilitating manufacture, assembly, and disassembly of the pipe sections, the relative relationships of the connecting means and the pipe members may be capable of being modified, changed or reversed to variously otherwise utilize the inventive concepts. In addition, it is contemplated that the inventive concepts may be employed in any multiple wall drill pipe, such as multiple wall drill pipe having three or more concentric pipe members. Thus, it is intended that alternative embodiments of the invention be included within the scope of the appended claims except insofar as limited by the prior art.

What is claimed is:

1. The method of mounting and assembly of an inner pipe member and an outer pipe member of a section of multiple wall drill pipe, comprising:

forming and locating a series of annular inner grooves and annular outer grooves in axially spaced relationship along the outer periphery of the inner pipe member and along the inner periphery of the outer pipe member, respectively;

mounting a radially innermost portion of a resilient compressible annular connecting member in each of the annular inner grooves along the inner pipe member for permanent association therewith during assembly and use of the section of multiple wall drill pipe with a radially outermost portion of the annular connecting member extending radially beyond the outer peripheral surface of the inner pipe member;

inserting one end of the inner pipe member into one end of the outer pipe member and causing relative axial displacement between the inner pipe member and the outer pipe member toward the assembled position;

sequentially compressing the annular connecting members during the relative axial displacement of the inner pipe relative to the outer pipe while maintaining each annular connecting member in the associated one of said inner grooves of the inner pipe member;

continuing the relative axial displacement between the inner pipe member and the outer pipe until all the inner grooves are axially aligned with all the corresponding outer grooves; and then terminating the relative axial displacement between the inner pipe member and the outer pipe member and expanding the radially outermost portions of annular connecting members into the outer grooves to permanently connect and axially locate the inner pipe member relative to the outer pipe member during use of the section of multiple wall pipe in a drilling operation.

2. The invention as defined in claim 1 and further comprising:

sequentially expanding and compressing a progressively increasing number of the annular connecting members during relative axial displacement from the disassembled position to the assembled position.

3. The invention as defined in claim 2 and further including the method of disassembly of the inner pipe member and the outer pipe member comprising:

causing relative axial displacement between the inner pipe member and the outer pipe member from the assembled position to the disassembled position by application of axial force in excess of the axial retention forces exerted by the annular connecting members between the inner grooves and the outer grooves in the assembled position.

4. The invention as defined in claim 3 and further comprising:

initiating the relative axial displacement between the inner pipe member and the outer pipe member by initial compression of all of the annular connecting members effectively holding the inner pipe member relative to the outer pipe member; and thereafter sequentially expanding and compressing a progressively lesser number of the effective annular connecting means than the total number of annular connecting members.

* * * * *